(12) United States Patent
Denisart et al.

(10) Patent No.: US 8,701,548 B2
(45) Date of Patent: Apr. 22, 2014

(54) BEVERAGE PREPARATION DEVICE HAVING A CLOSING MECHANISM WITH FORCE DEMULTIPLYING MEANS

(75) Inventors: Jean-Luc Denisart, Cully (CH); Ahmed Azouz, Prilly (CH); Larry Sacha Baudet, Preverenges (CH); Akos Spiegel, Chavannes-pres-Renens (CH)

(73) Assignee: Nestec S.A., Vevey (CH)

( * ) Notice: Subject to any disclaimer, the term of this patent is extended or adjusted under 35 U.S.C. 154(b) by 244 days.

(21) Appl. No.: 13/263,670

(22) PCT Filed: Apr. 8, 2010

(86) PCT No.: PCT/EP2010/054621
§ 371 (c)(1),
(2), (4) Date: Oct. 7, 2011

(87) PCT Pub. No.: WO2010/115946
PCT Pub. Date: Oct. 14, 2010

(65) Prior Publication Data
US 2012/0031281 A1 Feb. 9, 2012

(30) Foreign Application Priority Data
Apr. 9, 2009 (EP) .................................. 09157751

(51) Int. Cl.
*A47J 31/40* (2006.01)
(52) U.S. Cl.
USPC ........................................ 99/289 R; 99/295
(58) Field of Classification Search
USPC .................... 99/295, 302 R, 289 R
See application file for complete search history.

(56) References Cited

U.S. PATENT DOCUMENTS

| 7,318,373 | B2 | 1/2008 | Blanc et al. |
| 7,320,274 | B2* | 1/2008 | Castellani ........................ 99/295 |
| 7,513,192 | B2* | 4/2009 | Sullivan et al. ............ 99/289 R |
| 7,617,763 | B2* | 11/2009 | Chen et al. .................. 99/302 R |

(Continued)

FOREIGN PATENT DOCUMENTS

| CN | 1638769 | 7/2005 |
| CN | 1819789 | 8/2006 |

(Continued)

OTHER PUBLICATIONS

WO 2007/135136 A1 (Boussemart et al.) Nov. 29, 2007.*

(Continued)

*Primary Examiner* — Reginald L Alexander
(74) *Attorney, Agent, or Firm* — K&L Gates LLP (57) ABSTRACT

A device (50) for preparing a beverage from a food substance contained in a capsule (24) by feeding a liquid into the capsule (24) provided to the device (50), said device comprising an extraction head (20) which comprises: a first and second enclosing members (10a, 10b) delimiting a receptacle (25) for enclosing a capsule (24); a closing mechanism (1) to act on at least one (10a) of the enclosing members (10a, 10b) in relative displacement of the enclosing members, between an open position of the receptacle (25) and a closed position of the receptacle (25) with the capsule positioned therein; the closing mechanism (1) further comprising a locking means (13), a lever (21) and force demultiplying means (11) for transmitting a movement of the lever (21) into the relative displacement of the enclosing members (10a,10b); wherein the demultiplying means (11) are designed to vary a transmission ratio of the closing mechanism (1) acting between the lever (21) and at least one (10a) of the enclosing members (10a, 10b).

13 Claims, 5 Drawing Sheets

(56) References Cited

U.S. PATENT DOCUMENTS

| | | |
|---|---|---|
| 7,980,169 B2 * | 7/2011 | Fischer ............... 99/289 R |
| 2008/0041234 A1 | 2/2008 | Cortese |
| 2010/0173053 A1 | 7/2010 | Ryser et al. |

FOREIGN PATENT DOCUMENTS

| | | |
|---|---|---|
| CN | 1980588 | 6/2007 |
| CN | 101491415 | 7/2009 |
| EP | 1 859 712 | 11/2007 |
| EP | 1 859 714 | 11/2007 |
| WO | 2005004683 | 1/2005 |
| WO | 2007135136 | 11/2007 |

OTHER PUBLICATIONS

PCT International Search Report for Application No. PCT/EP2010/054621 Mailing Date of Aug. 4, 2010, 6 Pages.

* cited by examiner

BEVERAGE PREPARATION DEVICE HAVING A CLOSING MECHANISM WITH FORCE DEMULTIPLYING MEANS

CROSS REFERENCE TO RELATED APPLICATIONS

The present application is a National Stage of International Application No. PCT/EP 2010/054621, filed on Apr. 8, 2010, which claims priority to European Patent Application No. 09157751.0, filed on Apr. 9, 2009, the entire contents of which are being incorporated herein by reference.

FIELD OF THE INVENTION

The present invention relates to a device for preparing a beverage from a food ingredient provided to the device within a capsule. More particularly, the invention relates to such a device comprising an improved closing mechanism for enclosing the capsule, said closing mechanism comprising force demultiplying means for adjusting the closing force applied by an operator which is necessary to enclose a capsule within the device.

BACKGROUND OF THE INVENTION

Devices for preparing a beverage by injecting pressurized fluid to a capsule are well-known, especially in the field of producing coffee or coffee type beverages. In addition, other substances such as chocolate or milk ingredients can be extracted or dissolved to form a beverage. The advantages of such a system are in particular the conservation and freshness of the ingredients, as well as the possibility of facilitating the operations when preparing the beverage.

The method of preparing the beverages using such a device is in principle as follows. The capsule is usually first inserted into a capsule receiving chamber or a receptacle of the beverage preparation device. After that, a water injecting means, such as a needle connected to the liquid supply of the device is introduced through or pierces a face of a capsule to inject a hot or cold liquid, in order to make the liquid interact with the ingredients within the capsule. The liquid beverage resulting from this interaction is then discharged through a delivery face of the capsule. For example, the delivery face opens due to the internal pressure in the capsule generated by injecting the liquid or, alternatively, the face is already permeable by virtue of its structure.

It should be understood that the interaction between the liquid and the ingredients within the capsule can be dissolving, extraction, dilution, mixing or any other interactions in order to prepare a beverage by means of ingredients provided within the capsule.

The term "capsule" is meant to be any sort of portioned packaged food ingredients such as an aluminium and/or plastic food container, a filter paper pod or a combination thereof.

In general, a device for applying the above outlined interaction principle of beverage production is equipped with a closing mechanism in order to enable an enclosure of the capsule within the receptacle of the device. Such a closing mechanism usually comprises at least two enclosing members which can be moved relatively to each other and wherein the enclosing members may assume an open insertion position for inserting a capsule into the receptacle of the device and a closed enclosing position for enclosing the capsule within the receptacle of the device. In the enclosing position, the capsule is usually placed in fluid pressure tightness with the enclosing members which comprise water injection means for supplying water in the capsule. For operating such a closing mechanism, the mechanism usually comprises lever means which enable a user to transmit a force from the operator to the enclosing members in order to enclose the capsule within the receptacle.

WO 2005/004683 for example relates to a device for extracting a capsule comprising a knee-joint mechanism directly linked to a lever of the device in order to enclose a capsule by means of a first enclosing member which is movable with respect to a second enclosing member.

The disclosed embodiment of the device however suffers the disadvantage that a high force is required on the lever to close the extraction head. Thereby, the pressure remaining in the capsule must be overcome to pass the hard point of the knee-joint mechanism. Moreover, the rubber sealing provides an elastic force to be overcome when the injection part is pressed on the capsule which has to be countered in opening.

It is therefore desirable to provide force demultiplying means which are suitable for varying a transmission ratio between the lever and the enclosing members in order to facilitate the closing movement of the lever.

WO 2007/135136 for example refers to such device having a closing mechanism comprising additional force transmission means associated to the lever and arranged to de-multiply the force applied by the lever on a knee-joint mechanism that compensates for the increase of the force needed for closing the holding parts on the capsule. Thereby, the lever is attached to intermediate connecting rods for amplifying the lever force applied on the first axis of the knee-joint. The dimensions of the rods and the positions of the axis are thereby specifically designed for providing a constant force amplification. In WO 2007/135136, the angular path of the lever must be relatively high, in particular of at least 90 degrees from a full opening of the head enabling the insertion of a capsule to the full closure of the head about the capsule in a fluid tight manner. In other words, the user must pull the lever at about 90 degrees to fully open the head and must be able to insert a capsule between the holding members or remove a capsule holder from the head (either manually or by capsule ejection means).

For instance, when the device is placed in a confined area (e.g., in a small kitchen or in a niche below a cupboard), it is desirable to reduce the amplitude of movement of the lever and ensure the full, unhindered operation of the device in such area.

Hence, there is a need for proposing a solution consisting of rendering the closure even easier. There is also a need for reducing the angular path of the lever so that opening/closing can be done more straightforward and with much less handling.

The present invention therefore aims at providing a solution to the above-described problems.

The invention also aims at other objects and particularly the solution of other problems as will appear in the rest of the present description.

OBJECT AND SUMMARY OF THE INVENTION

The invention proposes a device for preparing a beverage from a food substance contained in a capsule by feeding a liquid into the capsule provided to the device, said device comprising an extraction head which comprises:
  a first and second enclosing members delimiting a receptacle for enclosing a capsule,
  a closing mechanism to act on at least one of the enclosing members in relative displacement of the enclosing members, between an open position of the receptacle and a closed position of the receptacle (25) with the capsule positioned therein, the closing mechanism further comprising a locking means, a lever and force demultiplying means for transmitting a movement of the lever into the relative displacement of the enclosing members, wherein the demultiplying means are designed to vary a transmission ratio of the closing mechanism acting between the lever and at least one of the enclosing members.

In a preferred mode of the invention, the demultiplying means connects the lever to the locking means by a cam-type mechanism forming a free sliding arrangement which is designed such that the lever distance (B) acting on the demultiplying means (11) is reduced progressively along with the closure movement of the lever.

The closing mechanism of the device can be used to selectively enclose the capsule within the receptacle of the device, by means of a relative displacement of the first and second enclosing member defining the receptacle or capsule-receiving chamber of the device. The closing mechanism can assume an open insertion position for inserting a capsule into the receptacle and a closed injection position for enclosing the capsule within the receptacle. Furthermore, the enclosing members of the closing mechanism are designed for being moved between said open insertion position and said closed injection position. Accordingly, by usage of the closing mechanism, the capsule provided to the receptacle of the device can effectively be enclosed between said enclosing members and thereby be effectively pierced by the injection member of the device connected to one of the enclosing members. Such an injection element can be a needle designed to pierce an upper face of the capsule which is therefore connected to the upper one of said enclosing member.

When the closing mechanism is in the open insertion position, the enclosing members are spaced apart from each other in order to enable the insertion of the capsule into the receptacle. To enclose the capsule within the receptacle, the closing mechanism may be operated thus enabling a relative movement of the two enclosing members. During said operation of the closing mechanism in order to enclose the capsule, the enclosing members are approached with respect to each other. A first enclosing member is preferably mounted mobile relative to the head (e.g., to a chassis of the head) and connected to the closing mechanism. Preferably, the second enclosing member is fixed relative to the extraction head. More preferably, the first enclosing member is an upper enclosing member connected to the closing mechanism whereas the second enclosing member is a lower member. The second enclosing member can be removably fixed to the head to facilitate insertion of the capsule in the receptacle remotely from the head.

As the closing mechanism further comprises force demultiplying means, the manual force necessary on the lever to enclose the capsule between the enclosing members of the receptacle can be effectively diminished during the actual closure movement. Furthermore, as the force demultiplying means is a cam-type mechanism forming a free sliding arrangement with the lever, the angular path of the lever can be significantly diminished.

The force demultiplying means are thus designed to vary a transmission ratio of the closing mechanism. Thereby, it should be understood that the term 'transmission ratio' refers here to the ratio between two forces measured on two mechanically linked components of a mechanical system. In particular, the transmission ratio from the actuation force on the lever to the closing force appearing between the enclosing members is varied continuously and monotonously throughout the motion range of these said components. Preferably, the transmission ratio between the actuation force and the closing force is largest at the open position of the lever and is smallest at the closed position of the lever. Thereby the closure of the device is greatly facilitated for the user in particular at the final stage of the closure where the largest closing force is required for providing a secure closure.

The variation of the transmission ratio provides a variation of the displacement ratio in such a way that the displacement of the point of actuation of the lever to the relative displacement of the closing members is varied continuously and monotonously throughout the motion range of these components. Preferably, the displacement ratio between the actuation displacement and the closing displacement is smallest at the open position of the lever and is largest at the closed position of the lever.

Hence, not only the closure movement of the lever and thus, the enclosing of the capsule between the enclosing members is facilitated, but also the opening movement of the lever when a user intends to separate the enclosing members with respect to each other.

Moreover, due to the sliding arrangement of the force demultiplying means, the necessary angular path of the lever used for enclosing the capsule by bringing the enclosing members to their injection position is minimized. Accordingly, an operator may enclose the capsule within the receptacle of the device by means of a relatively short rotational movement of the lever with respect to the device.

Therefore, the lever of the closing mechanism can be manipulated with one or two fingers in a very easy way, just by pushing the lever of less than 65 degrees. Thus, a more convenient enclosing of the capsule within the receptacle of the device is enabled and hence, the usability of the device in a confined area (e.g. in a small kitchen or in a niche below a cupboard) can be significantly enhanced.

The "locking means" is to be understood as a mechanism enabling to close the enclosing members about the capsule in a stably locked position. In a preferred embodiment, the locking means of the closing mechanism is a knee-joint mechanism comprising two rods, e.g., an upper and a lower rod, connected by an axle. It is thus possible to provide a space saving closing mechanism which is connected at least to a first one of the enclosing members. The second enclosing member is preferably provided at a fixed position inside the extraction head of the device. Hence, a relative movement of the first and the second enclosing member is enabled. In other possible embodiments, other locking means can replace the knee-joint mechanism such as a mechanism with hooks or latches, or an eccentric to close the two enclosing members in the stable position of closure about the capsule.

The sliding engagement can be formed by a cam path connecting the lever and a connecting extension member of the knee-joint mechanism which is preferably connected to an upper rod of the knee-joint mechanism such that a movement of the extension member is directly transferred to said upper rod.

In a preferred embodiment, the cam path is a linear or curved recess formed in a lateral extension member of the lever designed to guide a linear or curved movement of the connecting extension axis of the extension member of the knee-joint mechanism.

Thereby, the force demultiplying means are preferably designed to vary a distance between the rotational axis of the lever and the connecting extension axis of the knee-joint mechanism. In particular, the force demultiplying means are preferably designed such that the distance between the rotational axis of the lever and the connecting extension axis of the knee-joint mechanism is diminished along with the closure movement of the lever.

As said distance diminishes as the lever closes, the levers' displacement is compensated and thus, a smaller rotational path of the lever for the closure movement and thus, for transferring the enclosing members between their open insertion position and their closed position, is obtained. Thereby, the angular path of the lever necessary for the closure respectively opening movement lies preferably between 20 and 65°.

In a preferred embodiment, the device further comprises adjustment means connected to at least one of said enclosing members in order to adjust the relative position of the enclosing members, in particular, to compensate for the variations of dimensional tolerances. Furthermore, the adjustment means may further enable the control of the closing force of the closing mechanism in the closed position, in particular, when the closing mechanism forces against a spring biasing element such as a rubber-elastic joint (e.g., a layer or o-ring) placed on the enclosing member.

In a preferred embodiment, the axle connecting the upper and the lower rod of the knee-joint mechanism is an adjustable eccentric means. Therefore, by turning the eccentric axle, the arrangement and in particular the distance between the upper and the lower rod of the knee-joint mechanism can be modified.

Accordingly, the biasing force of the knee-joint mechanism when being in its closed position can be regulated by the eccentric axle and hence, the biasing force of the closing mechanism when being in its closed position can be adapted to the needs of a user of the device.

With a device according to the present invention, it is possible to enable an interaction between liquid supplied by the device and ingredients contained in a capsule provided to the device through an aperture at the extraction head. In a preferred mode, the internal pressure within the sealed capsule which is built up due to the liquid supplied to the capsule causes a lower face of the capsule to open and thus enables the output of the beverage to be prepared. Thereby, the injection of the liquid provided by the device takes place at an upper face of the capsule which can be pierced by an injection member of the device situated preferably at the first enclosing member. In a possible alternative, the capsule may already have an inlet port and the injection of liquid can be done by connecting an injection member such as a tube to an inlet port of the capsule. As already described, the output of the beverage to be prepared takes place at a lower face of the capsule thus, enabling a direct flow of the liquid. Accordingly, a container such as a cup can be placed beneath the capsule in order to receive the beverage to be prepared.

It should be understood that the device is preferably operated with a capsule containing ground coffee, soluble coffee, cocoa, chocolate, tea, milk ingredients and combinations thereof which can be made to interact with liquid injected into the capsule in order to prepare a beverage. The listed ingredients can be in the form of powder or liquid concentrate. Moreover, the capsule can be a capsule which delivery face is opened after the capsule is inserted into the device.

BRIEF DESCRIPTION OF THE DRAWINGS

Further features, advantages and objects of the present invention will come apparent for the skilled person when reading the following detailed description of embodiments of the present invention, when taken in conjunction with the figures of the enclosed drawings

DETAILED DESCRIPTION OF THE FIGURES

Figure 1:
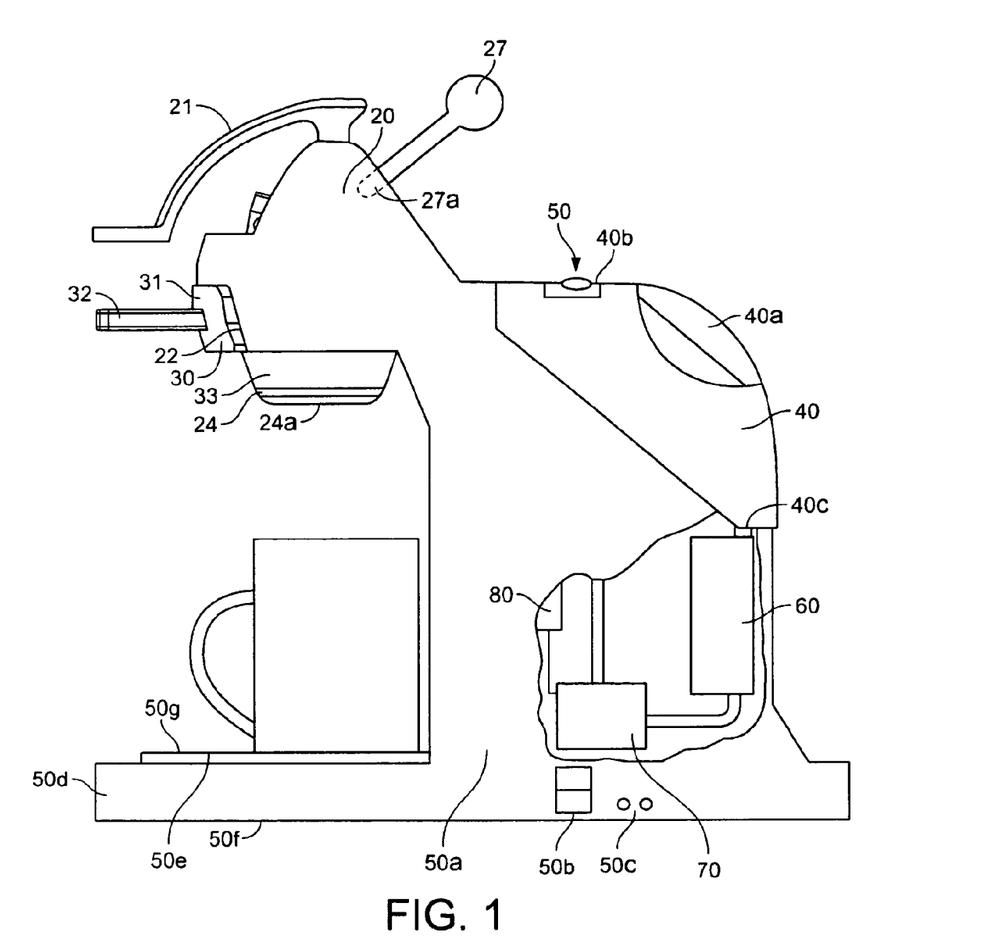
FIG. 1 shows a device for beverage preparation according to the present invention in side view.

FIG. 1 shows a beverage preparation device 50 according to the present invention in side view. The device 50 comprises a housing 50a containing at least water heating means 60, e.g. a boiler, a pump 70 and control means 80. Further the device comprises a reservoir 40 connected to the device, an extraction head 20 and a base 50f which is preferably provided with feet for standing the device thereon in a stable manner. The device further comprises a stand 50d for a receptacle such as a cup having an upper surface 50e provided with a grid 50g on which the receptacle is positioned.

The reservoir 40 is provided in order to supply liquid such as water to the heating means 60 and the pump 70, and hence to the extraction head 20 of the device 50. Inside the extraction head 20, an injection element 18 (see FIG. 3) is provided which is connected to the pump 70. Hence, when liquid is provided to said injection element 18, a capsule 24 pierced by the injection element 18 can be effectively provided with liquid and a beverage can be prepared from the ingredients within the capsule 24. Preferably, the reservoir 40 is connected to the device in a detachable manner and has an inlet 40b in order to fill liquid into the reservoir. The reservoir is preferably provided with a handhold 40a for facilitating the handling of the reservoir 40. Thus a user can handle the reservoir 40 in a convenient way during water refilling. An outlet 40c which is preferably situated at the bottom of the reservoir 40 enables a connection between the reservoir 40 and the device 50.

The extraction head 20 of the device comprises a chassis onto which is mounted a lever 21 connected to a closing mechanism 1 (see FIG. 2) for enclosing the capsule 24 in the device 50. The head can further comprise a pump control lever 27 (or other actuating means) for selectively supplying either cold or hot water to the extraction head 20 and hence to the capsule 24. The lever 21 as shown in FIG. 1 is in a closed position, thereby enclosing the capsule 24. The control lever 27 is connected to a valve such as a peristaltic valve for supplying heated or non-heated water to the head. The control lever further controls the activation of the pump via switches for instance. Hence, the control lever 27 may be switched over from a neutral position to a first position choosing hot water or to a second position choosing cold water by moving the control lever 27 to the left or to the right when seen in front-rear direction of the device 50. Accordingly, a user can choose whether to provide cold or hot water to the capsule 24 provided to the device in order to prepare a cold or hot beverage. For enabling the movement of the control lever 27, the housing 50a of the device 50 provides a groove 27a at the extraction head 20.

As can be seen in FIG. 1, a capsule-holder 30 may be inserted into the aperture 22 of the extraction head 20 in order to provide a capsule 24 housed in a cup portion 33 for receiving the capsule 24 in a cavity 25 of the portion and comprising a lower aperture 24a for the delivery of the beverage (see FIG. 3) of the extraction head 20. A handhold 32 is connected to the capsule-holder 30 in order to enable a convenient handling of the capsule-holder 30. Furthermore, the capsule-holder 30 is furnished with a front cover 31, which covers the aperture 22 when the capsule-holder is inserted into said aperture 22.

The device further comprises a main switch 50b and a plurality of control indicators 50c which may inform the user about the operating status of the device 50.

Figure 2:
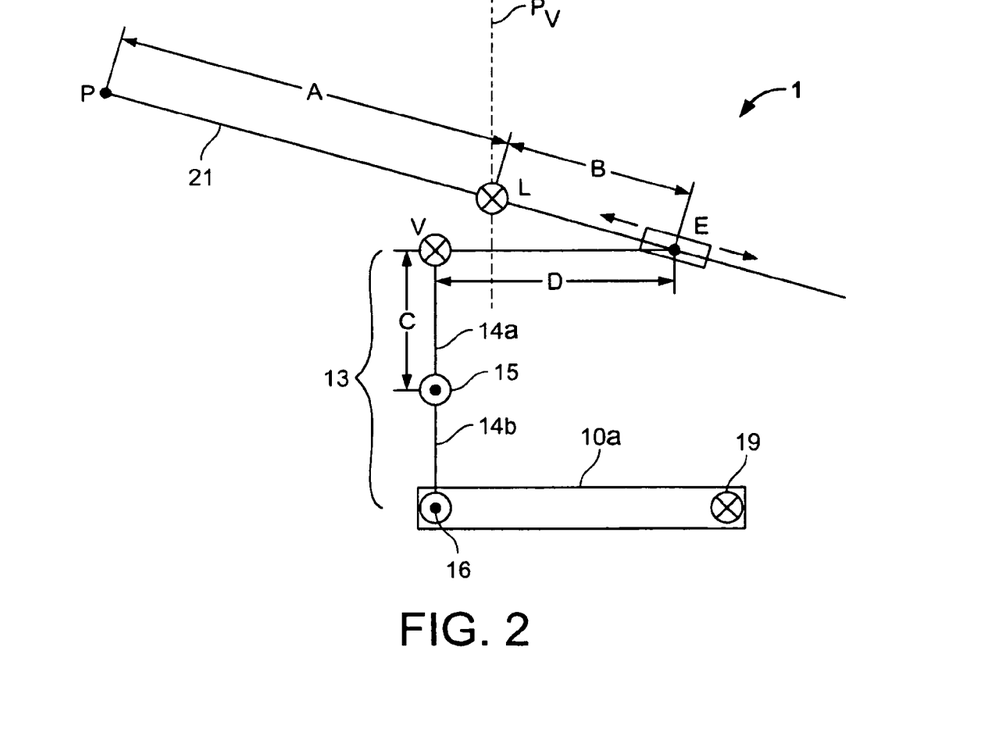
FIG. 2 is a schematic figure of the closing mechanism according to the present invention.

FIG. 2 is a schematic figure of the closing mechanism 1 according to the present invention. The closing mechanism comprises a lever 21 which can be rotated about its rotational axis L which is preferably fixed to the extraction head 20 (i.e., a chassis of the head). The point of activation P of lever 21 is the theoretical point at which the user preferably grabs the lever 21 in order to rotate it about its rotational axis L.

Furthermore, the closing mechanism 1 comprises locking means 13 which are used to enable a relative movement of the enclosing members 10a,10b. Moreover, the locking means 13 enable to place the closing mechanism in a stable locked position of no return when a capsule 24 (see FIG. 3) is to be enclosed by the enclosing members 10a,10b. The locking means 13 is here represented by a knee-joint mechanism however other locking means could be envisaged such as an eccentric member acting on enclosing member 10a.

The knee-joint mechanism 13 comprises an upper rod 14a which is preferably an L-shaped member able to rotate about a rotational axis K which is preferably fixedly arranged with respect to the extraction head 20 of the device. Moreover, the knee-joint mechanism 13 comprises a lower rod 14b which is movably connected to upper rod 14a by means of an axle 15. Thereby, the lower rod 14b is pivotally connected to a first enclosing member 10a of the device by pivot means 16. The enclosing member 10a is connected to the extraction head 20 of the device by pivot means 19. The pivot means 16 of the knee-joint mechanism 13 can be placed anywhere between the periphery and the centre of the member 10a but preferably distant from pivot means 19 linking the two enclosing members 10a, 10b. It should be noted that pivot means 19 can also have a degree of liberty in any axial direction (vertical and/or horizontal axis) to facilitate the positioning of the enclosing member 10a relative to the other enclosing member 10b.

At a rear portion of the lever 21, i.e. at the part of the lever 21 which extends from point P beyond the rotational axis L, the L-shaped upper rod 14a is connected to the lever 21 by means of an axle E. Thereby, axle E is preferably designed to be moved with respect to lever 21 during a rotational movement of the lever. In particular, axle E is preferably designed as being a cam-type mechanism which enables a free-sliding engagement of the lever 21 and the upper rod 14a of the knee-joint mechanism 13. Accordingly, a distance B which refers to the distance between axle E and rotational axis L of the lever 21 is varied during the rotational movement of lever 21 and knee-joint mechanism 13. Preferably, distance B is reduced progressively along with the closure movement of lever 21.

It should be understood that the rotational axes L, E, K, 15, 16 and 19 of the closing mechanism 1 are arranged parallel to each other.

As depicted in FIG. 2, axle E connecting the lever 21 and the knee-joint mechanism 13 is preferably arranged rearwards from the rotational axis L and K of the closing mechanism 1 and thus, beyond a vertical plane Pv in which axis L is arranged. Accordingly, axle E connecting the lever 21 and the knee-joint mechanism 13 is preferably not arranged between their rotational axes L,K but offset rearwardly.

During a rotation of lever 21 about axis L, a closing force is transmitted from the lever to the knee-joint mechanism 13 by means of axle E. Accordingly, the knee-joint mechanism 13 rotates about axis K, thereby transmitting a closing force from the knee-joint mechanism 13 to the enclosing member 10a by means of pivots 15 and 16. Accordingly, the enclosing member 10a is rotated about pivot means 19.

It should be noted that the direction of movement of the lever could be different from up-and-down but the lever could as well be arranged in direction differently such as to be able to rotate along a vertical axis.

Figure 3:
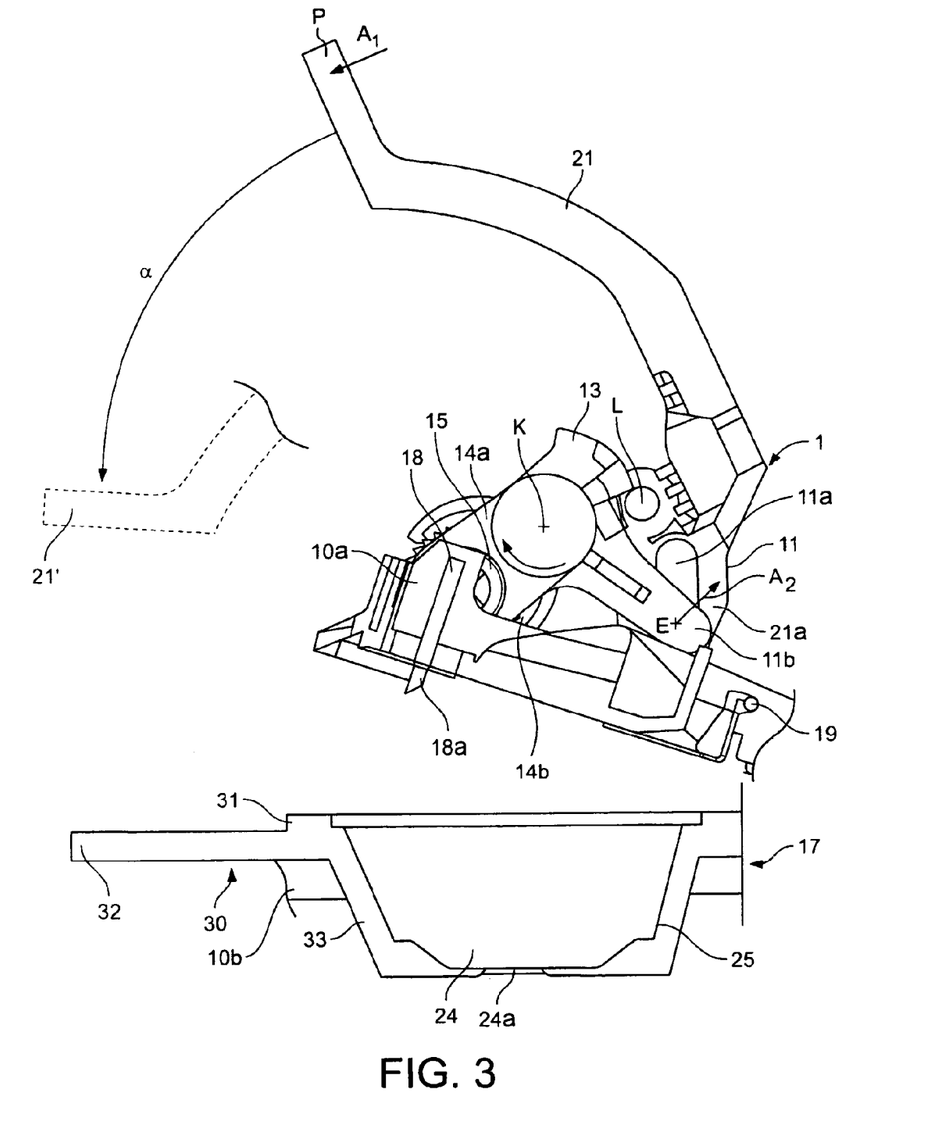
FIG. 3 shows a preferred embodiment of the closing mechanism according to the present invention, wherein the enclosing members are in their capsule insertion position.

FIG. 3 shows a preferred embodiment of the inside of the extraction head 20 of the device 50 in cross sectional side view, whereby the closing mechanism 1 of the device is in its open capsule insertion position.

In the shown embodiment, the capsule 24 is provided to the device 50 by means of a capsule-holder 30 which is inserted into the aperture 22 of the chassis 20 of the extraction head (see FIG. 1). As a result of the insertion of the capsule holder in the chassis 20, two enclosing members 10a, 10b are thus arranged in order to enclose the capsule 24 within a cavity 25 of the extraction head 20. The capsule 24 is thus enclosed by a first enclosing member 10a and a second enclosing member 10b. In this preferred embodiment, said second enclosing member 10b comprises the capsule holder 30 and guiding means provided within the aperture 22 of the extraction head 20 in order to keep the capsule-holder 30 inserted into the aperture 22 in a fixed position within the extraction head 20. In another preferred embodiment, wherein the capsule 24 is inserted into the aperture 22 and thus provided to the cavity 25 by hand, the second enclosing member 10b may be designed as guiding means for directly receiving the capsule 24 provided by a user. Thus, in such other preferred embodiment, a capsule 24 may as well be effectively enclosed with a capsule-holder 30 being already in place within the aperture 22.

The first enclosing member 10a is connected to the closing mechanism 1 in order to enable a relative movement of the two enclosing members 10a, 10b. Hence, the second enclosing member 10b is situated at a fixed position within the aperture 22 of the extraction head 20, whereas the first enclosing member 10a can be moved relatively to the second enclosing member 10b. Preferably, the first enclosing member 10a can be lowered or, respectively be lifted, in order to move towards or, respectively move away from the second enclosing member 10b. Accordingly, the enclosing members 10a, 10b are designed for being moved between an open insertion position as shown in FIG. 3 in which a capsule 24 or a capsule-holder 30 housing said capsule 24 is inserted into the cavity 25 of the device and a closed injection position (see FIG. 4) in which the capsule 24 is enclosed and pierced by the needle element 11 provided at one of the enclosing members 10a, 10b. Thereby, the first enclosing member 10a is the upper enclosing member and the second enclosing member 10b is the lower enclosing member.

The closing mechanism as shown in FIG. 3 is in its opened state in which the upper enclosing member 10a is in its upper position. Hence, the injection needle 18a connected to a liquid supply 18 and provided at the upper enclosing member 10a is prevented from piercing the capsule 24 which is housed by the cup portion 33 of the capsule-holder 30.

In order to enable a relative movement of the enclosing member 10a,10b, the closing mechanism 1 connected to the enclosing member 10a comprises pivoting means 19 arranged in vicinity of the back wall 17 of the extraction head 20 and a lever 21 to operate the closing mechanism 1.

The closing mechanism 1 as shown in FIG. 2 preferably comprises a knee-joint mechanism 13 which is connected between the lever 21 and the upper enclosing member 10a. Of course, any other closing or transmission mechanism may be connected at least one of the enclosing members 10a,10b in order to enable a relative movement of the two enclosing members 10a,10b.

As already described with respect to FIG. 2, the knee-joint mechanism 13 preferably comprises an upper rod 14a and a lower rod 14b which are movably connected to each other by means of an axle 15. Thereby, one arm 11b of the L-shaped upper rod 14a is preferably extending to the rear side of the extraction head 20, i.e. in the direction of the back wall 17.

Figure 5:
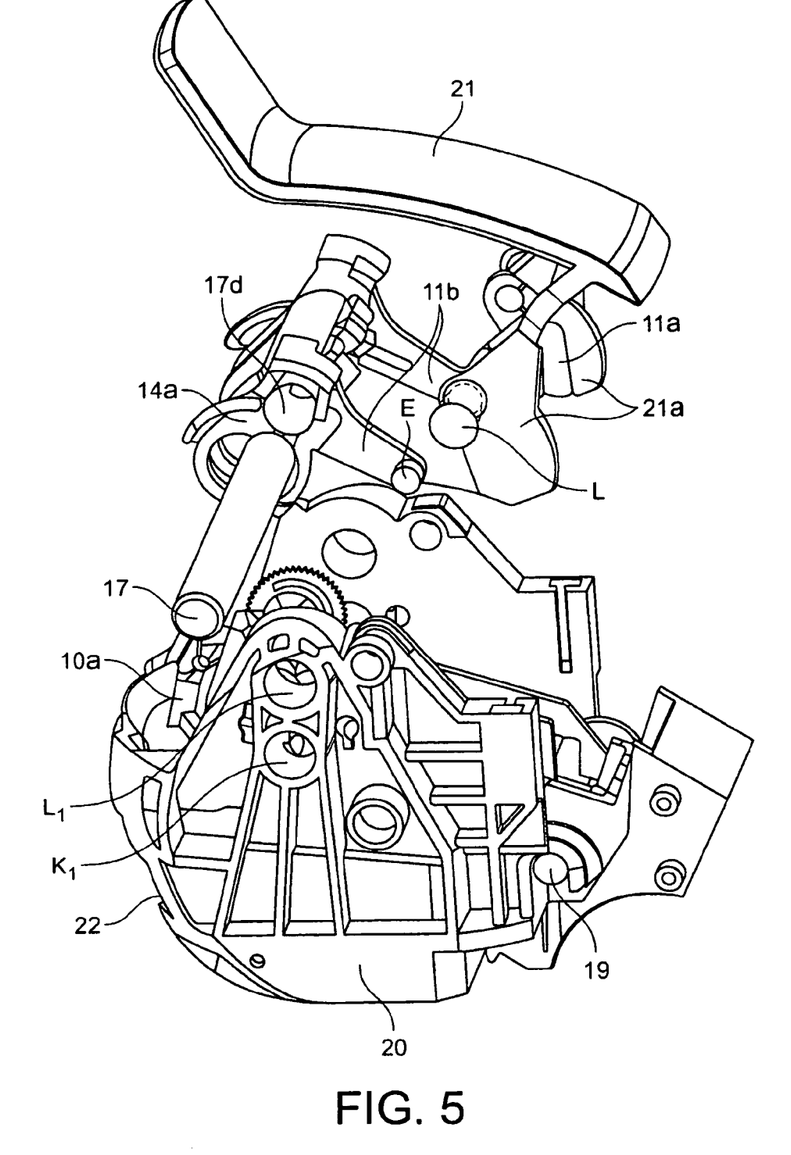
FIG. 5 shows an assembly drawing of the extraction head according to FIGS. 2 and 3 in perspective side view.

As can be seen in FIG. 3, the upper rod of the knee-joint mechanism 13 is connected to a lateral extension member 21a of the lever 21 by transmission means 11. Said transmission means 11 comprise a cam path 11a formed in the lateral extension member 21a of the lever 21 and an extension axle E connected to arm 11b of the knee-joint mechanism 13. Thereby, the extension axle E is slidably arranged within the cam path 11a in order to transfer a force exerted on the lever 21 to the knee-joint mechanism 13. The extension axle E can structurally be formed of two protrusions extending from the pair of arms 11b and engaging in recesses of the cam path 11a provided in the lever extension 21a of the lever (FIG. 5). Therefore, the cam path 11a is preferably a linear recess of constant diameter and depth formed in the lateral extension member 21a of the lever 21. The linear recess may be provided with retaining means to prevent the guided extension axle E respectively cam means forming said axle E from leaving the cam path 11a.

Figure 4:
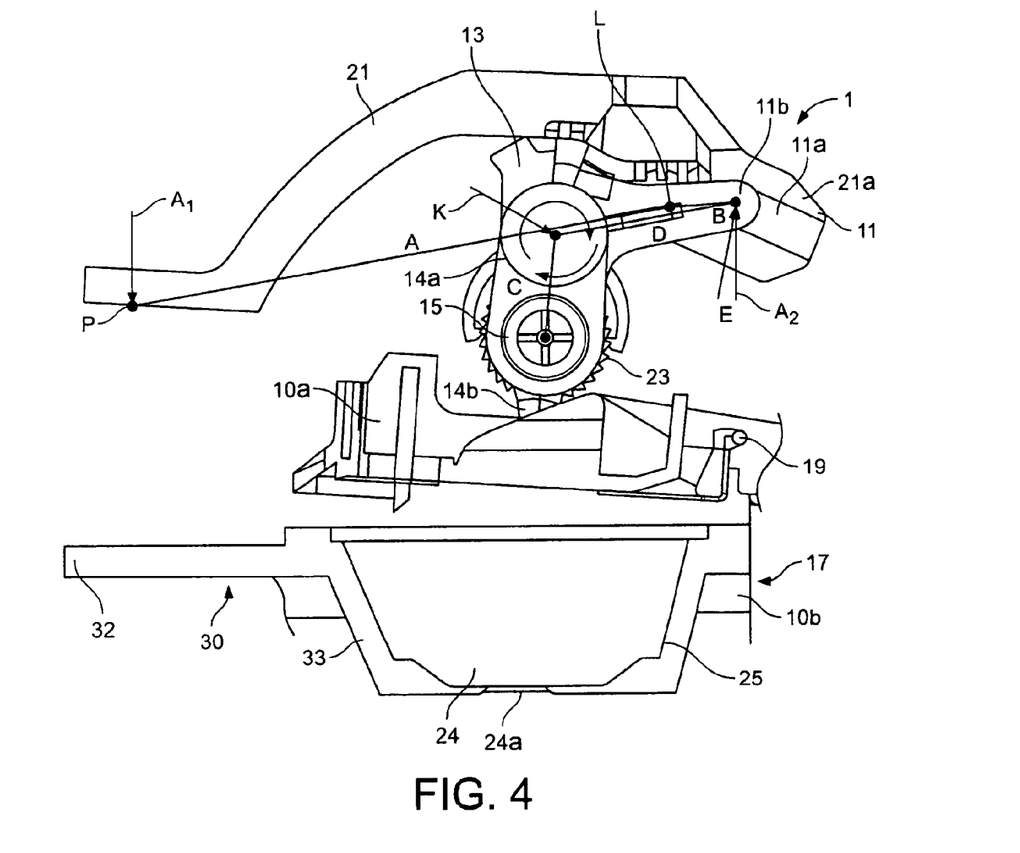
FIG. 4 shows the embodiment according to FIG. 3, wherein the enclosing members are brought almost in their closed position.

When a user of the device intends to enclose the capsule 24 within the cavity 25 and thus, between the enclosing members 10a,10b, the lever 21 is operated to be brought from the open insertion position as shown in FIG. 3 to the closed position of the lever as indicated in FIGS. 3 (reference numeral 21' in dotted lines) or 4 (reference 21 in solid line). Thereby, due to the ungeared sliding arrangement of the invention, the angular path α can be minimized to enable a quick and easy closing and opening procedure. Preferably, the angular path α is between 25 and 65 degrees.

During the closing procedure, the user presses the lever 21 down as indicated by arrow A1 in FIG. 3 and the lever 21 is thus rotated about its fixed rotational axis L. Accordingly, the force applied onto the lever 21 is transmitted by the force demultiplying means 11a,11b from the lever 21 to the knee-joint mechanism 13 as indicated by arrow A2. Therefore, the knee-joint mechanism 13 is rotated about its fixed rotational axis K and hence, the lower rod 14b of the knee-joint mechanism 13 exerts a downwardly acting force onto the upper enclosing member 10a which rotates the enclosing member 10a about the pivoting means 19 in order to enclose the capsule 24 in the cavity 25.

During the closing movement, the distance B (see FIG. 4) which is defined as the distance between the rotational axis L of the lever 21 and the extension axle E of the knee-joint mechanism 13 which is guided by the cam path 11a diminishes. Hence, with progressing closure of the closing means 1, the relation of the distance A, (see FIG. 4) which is defined as the distance between a point of contact P (user's hand) and the rotational axis L of the lever 21, and the distance B becomes greater. Accordingly, at the beginning of the closure movement, the transmission ratio from the lever 21 to the knee-joint mechanism 13 is smaller than at the end of the closure movement.

Hence, at the beginning of the closure movement, when less force is to be applied, a quick relative movement of the first and second enclosing member 10a,10b is enabled, thereby reducing the necessary angular path a of the lever 21.

FIG. 4 refers to a state wherein the lever 21 is almost in its closed position. Thereby, said state being the state in which a maximum force is to be applied by the user to overcome the hard point of the knee-joint mechanism 13, i.e. the point behind which the upper and lower rod 14a,14b of the knee-joint mechanism 13 are stability interlocking. Moreover, pressure remaining in the capsule 24 must be overcome at said point in order to pierce an upper face of the capsule 24 by means of the needle element 18a.

As can be seen in FIG. 4, the distance B which is varied during the closure movement due to the cam path 11a and the therein engaged extension axle E is diminished when compared to the open position of the closing mechanism 1 as shown in FIG. 3. In particular, the distance B is preferably continuously diminished during the closure movement of lever 21.

Hence, the force demultiplying means 11a,11b of the closing mechanism 1 are designed such that the demultiplying ratio corresponds to the ratio of the in FIG. 4 indicated distances A/B×D/C.

Thereby, as shown in FIG. 4, the distance D corresponds to the distance between the fixed rotational axis K and the extension axle E of the knee-joint mechanism 13. Moreover, the distance C corresponds to the distance between the axis K and the rotational axis of axle 15 connecting the upper and lower rod 14a,14b of the knee-joint mechanism 13. Preferably, distances C and D are preset distances which are not altered during the opening or closure movement of the closing mechanism 1.

According to the described embodiment, the force demultiplying means 11a,11b enable to demultiply the force of closure of the lever 21 which has to be applied by an operator of the device. Said demultiplying means are moreover arranged to particularly enable a high demultiplying ratio A/B×D/C at the end of the closure movement such that at the state of the closing mechanism 1 in which the highest force has to be applied by a human operator, the operation of the lever 21 is rendered extremely easy.

FIG. 5 relates to an assembly drawing of the extraction head 20. As can be seen in said figure, the lever 21 preferably comprises two lateral extension members 21a which are both provided with linear cam paths 11a at their inner side surface. To their outer side, the extension members 21a each comprise a protruding shaft which forms the rotational axis L of the lever 21. In order to provide a stable rotational support of the lever 21, said shafts are supported by dedicated support holes L1 provided at the extraction head 20.

The upper rod 14a of the knee-joint mechanism 13 preferably comprises two rearwardly extending arms 11b from which lateral outer surfaces a circular cam is protruding. Said cam is designed to be guided within the cam path 11a of the lever 21, thereby forming the rotational axle E of the knee-joint mechanism 13 (see FIG. 4).

Moreover, the upper rod 14a preferably comprises a bore 17a into which an axle 17 is connected thereby forming the rotational axis K as shown in FIG. 4. The axle 17 is fixedly supported by dedicated supporting bore K1 provided at the extraction head 20.

As can be seen in FIG. 4, the device may further comprise adjustment means 23 for varying the closing force of the enclosing members 10a,10b in the closed position of the closing mechanism 1 as described in pending European Application 07 123 482.7.

Although the present invention has been described with reference to preferred embodiments thereof, many modifications and alternations may be made by a person having ordinary skill in the art without departing from the scope of this invention which is defined by the appended claims. For example, any other closing mechanism may be applied in order to connect the force demultiplying means to the upper enclosing member 10a. Moreover, the lower enclosing member 10b can be any member beneath the upper enclosing member 10a which is provided at the extraction head 20 and suitable for enclosing a capsule 24. The design of the enclosing members 10a,10b may as regarding the injection conditions of the beverages to be prepared by piercing the capsule 24. It may as well be possible to provide more than two enclosing members in order to enclose a capsule or the like within a receptacle of the device.

The invention claimed is:

1. A device for preparing a beverage from a food substance contained in a capsule by feeding a liquid into the capsule provided to the device, the device comprising an extraction head comprising:
   a first and second enclosing member defining a receptacle for enclosing a capsule;
   a closing mechanism to act on at least one of the enclosing members in relative displacement of the enclosing members, between an open position of the receptacle and a closed position of the receptacle with the capsule positioned therein;
   the closing mechanism comprising a locking member, a lever and force demultiplying member for transmitting a movement of the lever into the relative displacement of the enclosing members; and
   wherein the demultiplying member is designed to vary a transmission ratio of the closing mechanism acting between the lever and at least one of the enclosing members, and the force demultiplying member connects the lever to the locking member by a cam mechanism forming a free sliding arrangement which is designed such that a distance between a cam of the cam mechanism and a rotational axis of the lever is reduced progressively along with the closure movement of the lever.

2. A device according to claim 1, wherein the lever is pivotally connected to the head by a rotational axis.

3. A device according to claim 1, wherein the transmission ratio between the actuation force and the closing force is greatest at the open position of the lever and is smallest at the closed position of the lever during a rotational movement of the lever around its rotational axis.

4. A device according to claim 1, wherein the cam mechanism is positioned rearwards of a vertical plane in which the rotational axis of the lever is positioned.

5. A device according to claim 1, wherein the closing mechanism is a knee-joint mechanism connected to at least one of the enclosing members.

6. A device according to claim 5, wherein the cam mechanism comprises a cam path connecting the lever and an arm of the knee-joint mechanism.

7. A device according to claim 6, wherein the cam path is a linear recess formed in a lateral extension member connected to the lever designed to guide a movement of cam connected to the arm of the knee-joint mechanism.

8. A device according to claim 5, wherein the knee-joint mechanism comprises an upper and a lower rod connected by an axle.

9. A device according to claim 1, wherein the force demultiplying member is designed to reduce the angular path of the lever for transferring the enclosing members between the open insertion position and the closed position.

10. A device according to claim 9, wherein the angular path of the lever is between 20 and 65°.

11. A device according to claim 1, wherein the device further comprises an adjustment member connected to at least one of the enclosing members in order to adjust the relative position of the enclosing members in closure.

12. A device according to claim 1, wherein the capsule contains a food substance selected from the group consisting of ground coffee, soluble coffee, tea, cocoa, chocolate, milk ingredients and combinations thereof.

13. A device according to claim 1, wherein the capsule is a sealed capsule which is opened after liquid is inserted into the capsule due to an increase in the pressure in the capsule.

* * * * *